US009460237B2

(12) United States Patent
Nguyen et al.

(10) Patent No.: US 9,460,237 B2
(45) Date of Patent: Oct. 4, 2016

(54) PREDICTIVE 411

(71) Applicant: 24/7 CUSTOMER, INC., Campbell, CA (US)

(72) Inventors: Patrick Nguyen, Alameda, CA (US);
Trey Lindseth, Oakland, CA (US);
Quang Nguyen, Union City, CA (US)

(73) Assignee: 24/7 CUSTOMER, INC., Campbell, CA (US)

( * ) Notice: Subject to any disclaimer, the term of this patent is extended or adjusted under 35 U.S.C. 154(b) by 27 days.

(21) Appl. No.: 13/875,607

(22) Filed: May 2, 2013

(65) Prior Publication Data

US 2014/0330769 A1    Nov. 6, 2014

Related U.S. Application Data

(60) Provisional application No. 61/644,347, filed on May 8, 2012.

(51) Int. Cl.
*G06F 17/30* (2006.01)
(52) U.S. Cl.
CPC ................. *G06F 17/3097* (2013.01)
(58) Field of Classification Search
None
See application file for complete search history.

(56) References Cited

U.S. PATENT DOCUMENTS

| | | | |
|---|---|---|---|
| 7,684,556 B1 | 3/2010 | Jaiswal | |
| 8,155,297 B1 | 4/2012 | O'Reilly, Jr. et al. | |
| 8,754,777 B1* | 6/2014 | Mendis | 340/636.1 |
| 2002/0059370 A1 | 5/2002 | Shuster et al. | |
| 2002/0164000 A1* | 11/2002 | Cohen | H04M 3/493 379/88.17 |
| 2003/0179864 A1* | 9/2003 | Stillman | H04M 3/42229 379/88.18 |
| 2006/0031486 A1* | 2/2006 | Miner | 709/224 |
| 2006/0122976 A1 | 6/2006 | Baluja et al. | |
| 2007/0208730 A1 | 9/2007 | Agichtein et al. | |
| 2007/0264968 A1 | 11/2007 | Frank et al. | |
| 2007/0271229 A1* | 11/2007 | Ho et al. | 707/3 |
| 2007/0294064 A1* | 12/2007 | Shuster | G06F 17/30867 703/3 |
| 2008/0248815 A1* | 10/2008 | Busch | 455/456.5 |
| 2009/0100018 A1* | 4/2009 | Roberts | G06Q 30/0603 |
| 2010/0036830 A1 | 2/2010 | Lee et al. | |
| 2010/0161720 A1* | 6/2010 | Colligan | G06Q 30/02 709/203 |

(Continued)

FOREIGN PATENT DOCUMENTS

WO    2009156978 A1    12/2009

OTHER PUBLICATIONS

U.S. Appl. No. 61/663,822, filed Jun. 25, 2012.*

(Continued)

*Primary Examiner* — Jay Morrison
(74) *Attorney, Agent, or Firm* — Michael A. Glenn; Perkins Coie LLP

(57) ABSTRACT

A system predicts the intent of a user and proactively offers to perform a query that satisfies that intent. Upon the user's acceptance of the offer, the system begins a search for related information. The system examines such factors as search terms typed or spoken by said user, historical attributes of said user, historical journey attributes of said user, current journey attributes of said user, user location, user movement, current time, user profile, user calendar, user information stored on, or associated with, a device within the user's possession. The system then makes a prediction of any of the user's intent, query category, and issue category. Based upon the results of the system's prediction, a query that is relevant to the user's intent and/or issue categories is presented and, upon the user's command, the results of the search are returned to the user.

20 Claims, 7 Drawing Sheets

(56) References Cited

U.S. PATENT DOCUMENTS

| | | |
|---|---|---|
| 2010/0312369 A1* | 12/2010 | Dollar, Jr. ................... 700/94 |
| 2010/0318538 A1 | 12/2010 | Wyman et al. |
| 2011/0050503 A1* | 3/2011 | Fong et al. ................. 342/451 |
| 2011/0118978 A1* | 5/2011 | Li ............................. 701/207 |
| 2011/0202514 A1* | 8/2011 | Singh ......................... 707/706 |
| 2011/0320440 A1* | 12/2011 | McDonald et al. ......... 707/723 |
| 2012/0009890 A1 | 1/2012 | Curcio et al. |
| 2012/0084248 A1* | 4/2012 | Gavrilescu ........ G06F 17/30867 706/52 |
| 2012/0265433 A1* | 10/2012 | Viola et al. ................. 701/410 |
| 2012/0290383 A1* | 11/2012 | Busch ........................ 705/14.36 |
| 2013/0346403 A1* | 12/2013 | Petersen ................. H04L 67/10 707/723 |
| 2014/0278064 A1* | 9/2014 | Lee et al. ..................... 701/428 |
| 2014/0330505 A1* | 11/2014 | Wenneman et al. ......... 701/117 |
| 2014/0330769 A1 | 11/2014 | Lindseth et al. |

OTHER PUBLICATIONS

U.S. Appl. No. 61/663,842, filed Jun. 25, 2012.*
U.S. Appl. No. 61/663,805, filed Jun. 25, 2012.*
U.S. Appl. No. 61/663,814, filed Jun. 25, 2012.*
U.S. Appl. No. 61/664,104, filed Jun. 25, 2012.*
Bellotti, V. et al., "Activity-Based Serendipitous Recommendations with the Magitti Mobile Leisure Guide", CHI 2008 Proceedings—On the Move; Florence, Italy, Apr. 5-10, 2008, pp. 1157-1166.

* cited by examiner

PREDICTIVE 411

CROSS REFERENCE TO RELATED APPLICATIONS

This application claims priority to U.S. provisional patent application Ser. No. 12/733,084, filed May 8, 2012, which application is incorporated herein in its entirety by this reference thereto.

BACKGROUND OF THE INVENTION

1. Technical Field

The invention relates to information services. More particularly, the invention relates to predictive information services.

2. Description of the Background Art 4-1-1 is the telephone number for local directory assistance in the United States and Canada. The services of 4-1-1 queries are often outsourced to a call center that specializes in that function. Historically, when a single carrier provided most of the telephony services for a region, the data used to satisfy the search could exclusively come for that carrier's subscriber rolls. Today, when the market is fragmented amongst many carriers, the data must be aggregated by a data aggregator specializing in directory listings, such as LSSi. The data aggregator distributes the data to the 4-1-1 services either on a live basis, actually servicing each query, or by periodically transferring large swaths of listings to the call center's systems for local searching.

The data aggregator collects the data from the rolls of many telecommunication carriers. Some carriers, such as Vonage, do not send their customer rolls to the aggregator. Their customers can get their listings in the directory assistance database using a free service such as ListYourself.net.

Directory assistance systems incorporate a wide range of automation to reduce the cost of human operators. Almost all systems use custom database software to locate listings quickly. Most directory assistance systems use automated read back systems to give out the phone number. This frees the directory assistance operator to move on to another caller as soon as the correct listing is located.

Some systems have store and forward technology which records the "city and state" that the caller is requesting and then plays the city and state speech to the operator before the operator comes online and then says "Residential or business listing?" or simply "What listing please?"

Interactive voice response systems have been added to many directory assistance systems. These complex systems use speech recognition and recorded speech or speech synthesis to handle the entire call without live operator intervention. Most systems recognize location and listing. If recognition confidence is high, the best result is played to the caller. If confidence is low, the caller's request is played back to a live operator, who locates the correct listing.

In all cases, little progress has been made in addressing the increased demands for more information than merely a telephone number when a user requests information with his phone. For example, a user may want to find a category of goods or services, and not merely a specific telephone number. Further, modern smartphones allow the user to receive and navigate within much more information than is provided by traditional 4-1-1 services. As such, live operator support for such service is prohibitively expensive and user navigation within such information becomes daunting.

SUMMARY OF THE INVENTION

In an embodiment of the invention, the system predicts the intent of the user and proactively offers to perform a query that satisfies that intent. Upon the user's acceptance of the offer, the system begins a search for information related to an issue, concern, product, etc., for example using a handheld device, such as a smartphone The system examines such factors, inter alia, as the search terms typed or spoken by said user, historical attributes of said user, historical journey attributes of said user, current journey attributes of said user, user location, user movement, current time, user profile, user calendar, user information stored on, or associated with, a device within the user's possession. The system then makes a prediction of any of the user's intent, query category, and issue category. Based upon the results of the system's prediction, a query that is relevant to the user's intent and/or issue categories is presented and, upon the user's command, the results of the search are returned to the user.

DETAILED DESCRIPTION OF THE INVENTION

In an embodiment of the invention, the system predicts the intent of the user and proactively offers to perform a query that satisfies that intent. Upon the user's acceptance of the offer, the system begins a search for information related to an issue, concern, product, etc., for example using a handheld device, such as a smartphone. The system examines such factors, inter alia, as the search terms typed or spoken by said user, historical attributes of said user, historical journey attributes of said user, current journey attributes of said user, user location, user movement, current time, user profile, user calendar, and user information stored on, or associated with, a device within the user's possession. The system then makes a prediction of any of the user's intent, query category, and issue category. Based upon the results of the system's prediction, a query that is relevant to the user's intent and/or issue categories is presented and, upon the user's command, the results of the search are returned to the user and/or an action may be taken on the user's behalf such as, for example, dialing a telephone number, sending a text message, sending an email, navigating to a Web page, posting content to a social media site, opening an application; scheduling an appointment and/or meeting, proposing an alternate meeting location, and performing text to speech conversion of a query result.

User Interface
Query

Figure 1:
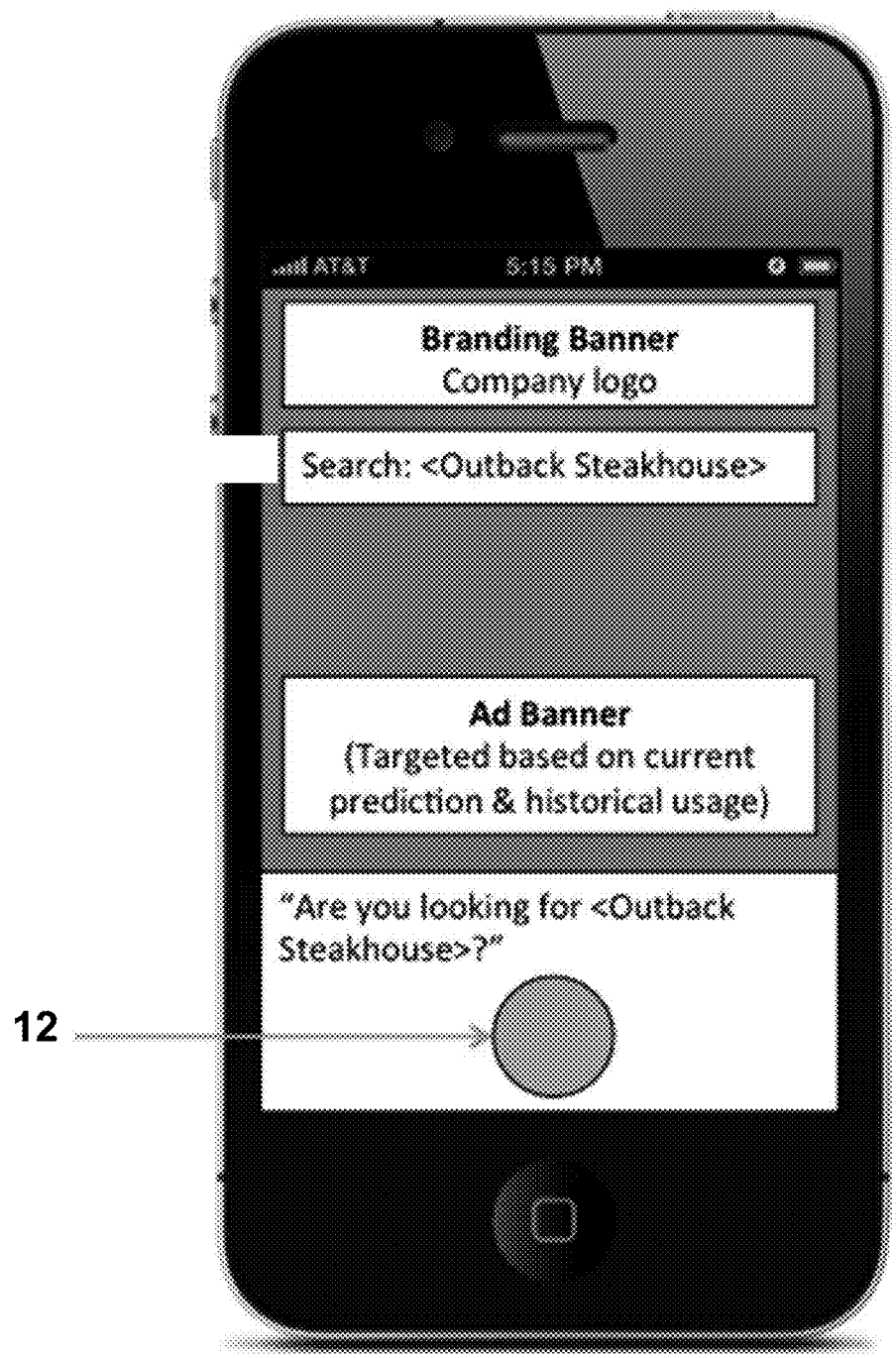
FIG. 1 is a plan view of a smart phone showing an introduction screen with prediction according to the invention.

FIG. 1 is a plan view of a smart phone showing an introduction screen with prediction according to the invention. A push-to-talk switch 12 allows the user to utter a command or speak a query, which is then processed, although other embodiments of the invention allow a user to enter a query through other techniques, such as by text entry.

In this embodiment of the invention, a session proactively offers a query that matches the user's intent and presents this query visually and/or by playing an audio prompt and/or displaying text and/or graphic or video information to the user. In a conventional session, the user would enter a query, such as "I am looking for a steakhouse." In an embodiment of the invention, the system does not wait for the user to enter a query, but rather predicts a query when triggered by a user-defined or system-defined event, such as the launch of an application, a comparison of GPS coordinates, the time until the user's next meeting, or the location of the user's next meeting. For example, if the user's calendar shows the location of an upcoming meeting as "steakhouse", the system would offer to search for a steakhouse near the user's current location. The system could check if a nearby steakhouse has available seating, and could also send directions and/or a map to the other attendees of the meeting.

In conventional search technology, such as Siri offered by Apple Inc., the user enters a query in response to a general question such as "How can I help you?" In an embodiment of the invention, the system guesses the user's query at the start of the session by predicting the user's area of interest. This prediction can be based upon an awareness of the user's location, recent activities, history, and other factors. For example, if the user is in a shopping mall, as detected by the GPS system in the user's smartphone, and on previous visits to the shopping mall the user had called ahead for seating in a restaurant in the mall, then the system may proactively provide a user with an offer such as "Would you like to check on availability of a table?" This proactive offer may be delivered through an alert initiated by the application or service, i.e. not initiated by any action on the part of the user, or it may be initiated based on a user action on the smartphone. User acceptance of this proactive offer would invoke a transaction that may, for example, check a Web-based reservation system for the restaurant in question and, if appropriate, offer to make a reservation for the user at that restaurant.

In an embodiment of the invention, the proactive offer is presented to the user by playing a prompt, and the user response is processed through a speech recognition grammar and the results are returned to the user. While grammar-based speech recognition is used in an embodiment of the invention, those skilled in the art will appreciate that other speech recognition techniques may be used in connection with the invention, such as natural language prediction and the like.

In an embodiment of the invention, the primary predictive capabilities are applied before the user enters a query. For example, when the user launches the application, it uses data from the user's calendar, contacts, and current location to predict what the user is searching for.

There are additional predictive capabilities that may be applied after the user enters a query. For example, in FIG. 2 the preferred order in which locations are presented, based on proximity to the users current location or proximity to a future meeting location, i.e. from the calendar, may be predicted. Similarly, the system may predict with which of the user's contacts he wants to share information.

In this embodiment of the invention, a user session proceeds as follows:
Proactive Offer FIG. 1 is a view of a smart phone that shows a proactive offer based on a predicted intent. When the offer is displayed on the screen, the following prompt is played:

"Are you searching for <Outback Steakhouse>?"
The possible responses include:
Yes
Yes, the one in <city>
No
No, the <closest> <Starbucks>

An embodiment of the invention provides for personalization of the results returned to the user. This can include, for example:
Preferred business name;
Preferred business location;
Preferred contact method with business;
Preferred contact method with whom a user shares information; and
Current location for case of multiple nearby listings for business name.

Figure 2:
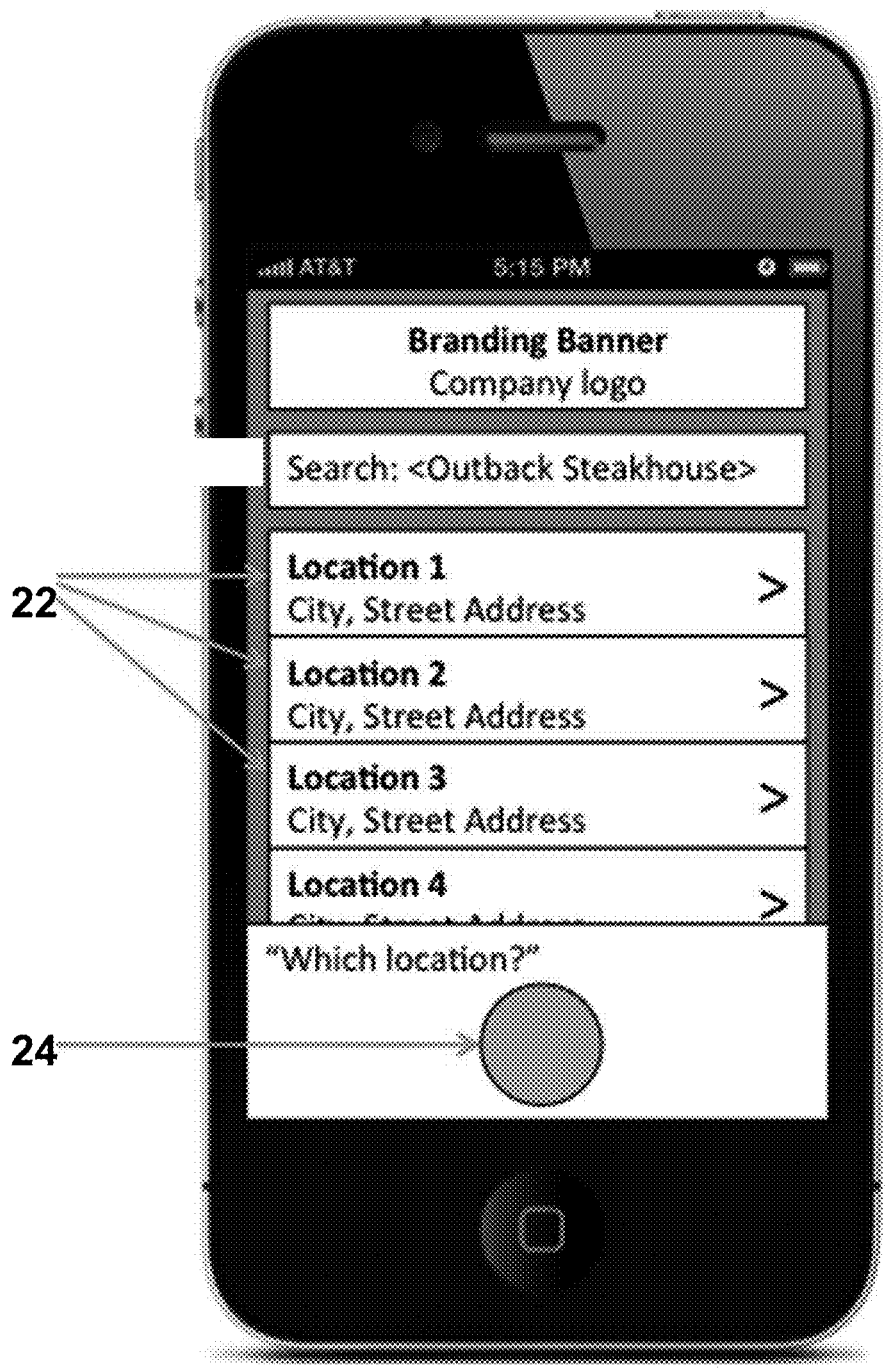
FIG. 2 is a plan view of a smart phone showing a predicted results screen with multiple business listings according to the invention.

In this embodiment of the invention, the user session proceeds as follows:
Multiple Results FIG. 2 is a view of a smart phone showing a predicted results screen with multiple business listings according to the invention. A list of items allows the user to drill to a details screen 22. Prediction is used to determine in what order query results are presented on the screen. Possible sorting orders include, but are not limited to, proximity to the user's current location, proximity to a future meeting location, direction of movement determined by smartphone GPS, previous user preferences, etc. A push-to-talk switch 24 allows the user to speak a query, for example, to make a selection from the list, which is then processed, for example to place a call to the selected location or to navigate the user's browser to the website for the location. This screen is typically used only when multiple locations exist for the business name.

When the query results are displayed on the screen, the following prompt is played:
"Which location?"
The possible responses include:
The <first> one;
The one in <city>;
The one on <street name>;
No, the <closest> <Jamba Juice>; and
Connect me with the one on <street name> (initiate Dialer).

An embodiment of the invention provides for personalization of the results returned to the user. This can include, for example:
Preferred business name;
Preferred business location;
Preferred contact method with business;
Preferred contact method with whom a user shares information; and
Current location for case of multiple nearby listings for business name.

Figure 3:
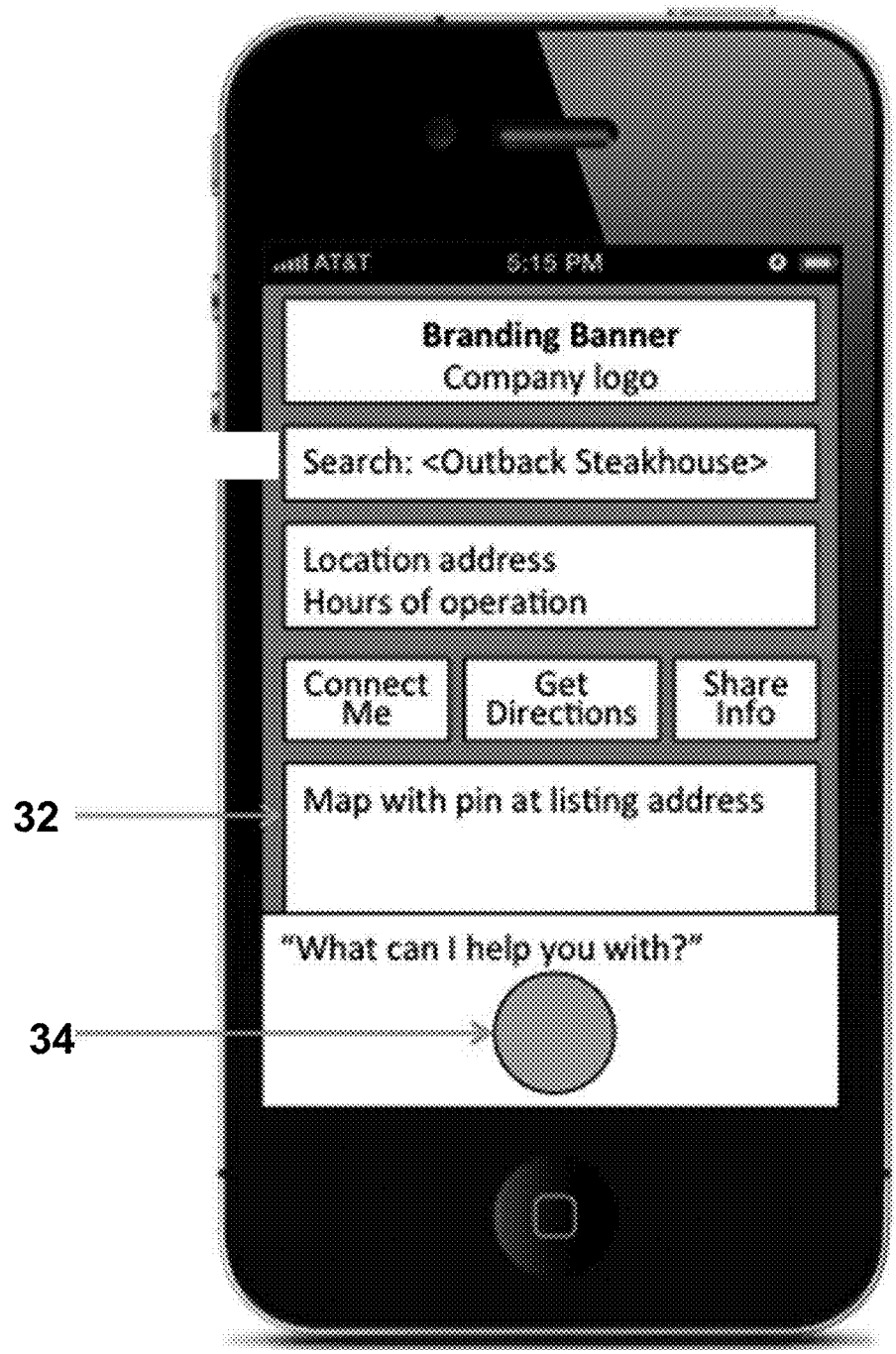
FIG. 3 is a plan view of a smart phone showing business details according to the invention.

In this embodiment of the invention, a user session then proceeds as follows:
Business Details FIG. 3 is a view of a smart phone showing business details according to the invention. An interactive feature set 32 allows the user, for example, to zoom in/out, move focus, etc. A push-to-talk switch 34 allows the user to speak a query, which is then processed, for example to present directions from the user's current location to that of the query result on the display of the user's smartphone. This screen is used when a single location exists for the business name (see FIG. 1), or after user selects a location from the list (see FIG. 2).

When the business details are displayed on the screen, the following prompt is played:

"Would you like me to connect you?"
The possible responses include:
Connect me (initiate Dialer);
Share with <name on meeting invite>;
Different location;
The one in <city>;
The one on <street name>; and
No, the <closest> <Jamba Juice>.

An embodiment of the invention provides for personalization of the results returned to the user. This can include, for example:
Preferred business name;
Preferred business location;
Preferred contact method with business;
Preferred contact method with whom a user shares information; and
Current location for case of multiple nearby listings for business name.

In this embodiment of the invention, the user session proceeds as follows:

Information Sharing

When the business details are displayed on the screen, the possible responses include:
Share with <first name>;
<Last name>;
Share with all; and
Send text message/email to <first name/last name/all>.

Figure 4:
FIG. 4 is a plan view of a smart phone showing a dialog for sharing business information according to the invention.

FIG. 4 shows the dialog of the contacts selected according to an embodiment of the invention. When the user response to share the information with some specified contacts is recognized, a dialog is provided 40 with which the user can integrate the session with a contacts application.

Use Cases

411 Prediction Based on Calendar Appointments

The use case and scenario for this embodiment of the invention is illustrated as follows:

Ken is meeting a colleague at an unfamiliar restaurant in 30 minutes. He needs directions and wants to send the restaurant's address to his colleague. Ken launches the 411 app, which predicts he needs information about this restaurant. He gets driving directions with current traffic and sends the address to his colleague via SMS all within the 411 application.

In this use case, the data used comprises:
Calendar: scheduled meetings, meeting invitees, meeting location
Contacts: full contact list
Location: current location, directional movement
Time 411 Prediction with Integration to Reservation Systems The use case and scenario for this embodiment of the invention is illustrated as follows:

Amelia is running late for her dentist appointment and wants to confirm her dentist can still see her at the later time. She launches the 411 app, which predicts, based on her current location and the dentist's address, that she is running late. The 411 app proactively contacts the dentist's reservation system and determines that the only opening that will fit Amelia's schedule is 2 pm that afternoon. The reservation is updated in both the dentist's reservation system and Amelia's calendar.

In this use case, the data used comprises:
Calendar: scheduled meetings, meeting invitees, meeting location
Contacts: full contact list
Location: current location, directional movement
Time
Reservation systems: restaurants, doctor and/or dentist offices, etc.

411 Prediction Based on Usage History

The use case and scenario for this embodiment of the invention is illustrated as follows:

Tania used the 411 app to search for locations of her favorite home goods store, but has not visited any of the retailer's locations since she performed the search. Tracking Tania's location over time, the 411 app is aware that she has not visited any of the store's locations. As Tania's current location approaches one of the home goods stores, the 411 app evaluates based on, for example, time-of-day, day-of-week, and her previous purchase behavior, whether Tania should be notified of the nearby store location. Because it is Thursday evening and Tania often goes shopping at that time, the 411 app sends Tania an alert with the address and hours of operation of the nearby home goods store.

In this use case, the data used comprises:
Location: current location, directional movement, location history Historical search and purchase behavior
Store locations
Time Data Sharing for Expedited 411 Service The use case and scenario for this embodiment of the invention is illustrated as follows:

Patrick needs to replace his dead car battery. Because he wants a hard-to-find brand, he plans to contact several retailers to see if they have his battery in stock and to get a price check. Patrick launches the 411 app and searches for nearby locations of auto parts retailers. As Patrick is connected to each retailer, it provides him with the current hold and/or wait time until an agent will be available to take his call. The 411 app proactively offers to expedite Patrick's call, i.e. move him up in the agent queue, in exchange for sharing certain information with the business that it would find useful, e.g. Patrick's name, address, phone number, etc.

In this use case, the data used comprises:
Personal: name, address, phone number, photo, etc.
Location: current location, directional movement
Prediction A key aspect of the invention is predicting a user's intent and presenting an appropriate query to the user before the user enters a specific query and/or to enhance the results returned in response to the user's query. Predictive techniques that may be used in connection with the subject invention are disclosed, for example, in commonly owned patent application Ser. No. 13/239,195, filed Sep. 21, 2011; Ser. No. 13/349,807, filed Oct. 9, 2012; Ser. No. 13/454,726, filed Apr. 24, 2012; Ser. No. 13/461,631, filed May 24, 2012; Ser. No. 13/443,782, filed Apr. 10, 2012; and Ser. No. 13/599,974, filed Aug. 30, 2012, each of which application is incorporated herein in its entirety by this reference thereto.

Prediction

An Embodiment

Figure 5:
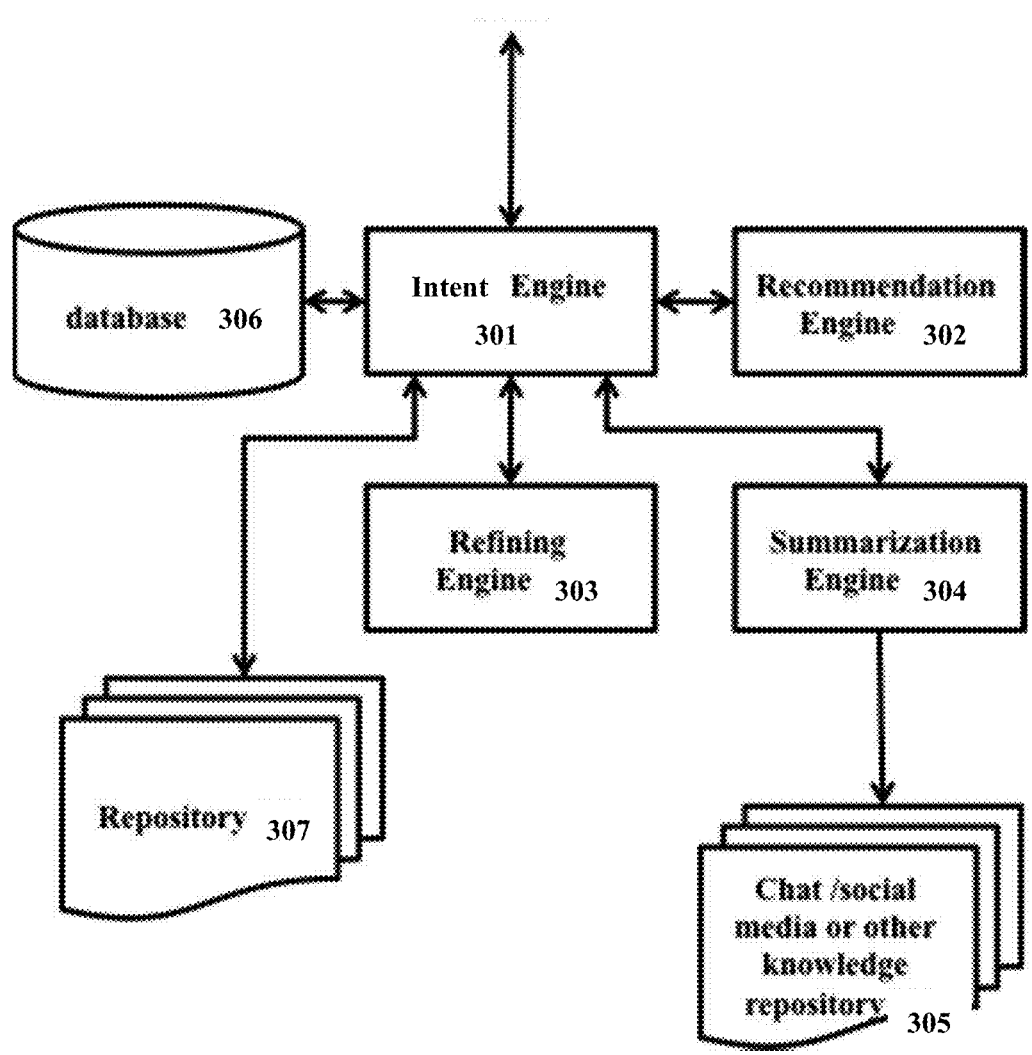
FIG. 5 is a block schematic diagram that depicts a prediction system according to the invention.

FIG. 5 is a block schematic diagram that depicts a prediction system in accordance with an embodiment of the invention that comprises an intent engine 301, a recommendation engine 302, a refining engine 303, a summarization engine 304, a knowledge repository 305, a database 306, and at least one repository 307.

The intent engine 301 enables the system to perform searches on at least one repository 307 of information. The system may interact with the intent engine 301 using a suitable API, or any other suitable means.

The intent engine 301 fetches information related to the user from the database 306. The information fetched from the database 306 comprises, for example, prior search words and results for searches performed by the user and other users who may be associated with the user; historical attributes of said user, historical journey attributes of said user, current journey attributes of said user, user location, user movement, current time, user profile, user calendar, or user information stored on, or associated with, a device within the user's possession; text mined chat transcripts; meta data of the chats; text mined voice transcripts; information present in social networks; information related to the user, including attributes from the CRM system about the users, for example, in the case of a telecom company, the user information could involve attributes such as billing data, past bills, mobile plan, etc.; data from the enterprise pages; any forms filled by the user; and so on. The intent engine 301 sends the information fetched from the database 306 to the recommendation engine 302.

The recommendation engine 302 probabilistically predicts the search query given the above mentioned attributes of the user. Probability for a given search query is determined as a function of, for example, information that may be resident on a user device, for example the user's contacts, calendar, emails, location, direction of travel, and the like, user attributes from CRM and other sources, history of prior contacts through all channels, behavior on the website, behavior on the Web before coming into the website, e.g. search engine, and other relevant parameters. The recommendation engine 302 may use one of several algorithms, such as Naïve Bayes, logistic regression, and/or support vector machines (SVM) to predict the probability that a given query is the query of interest for the user.

The recommendation engine 302 sends the predicted search query to the intent engine 301. The predicted search query may be in the form of a key word or key string.

The intent engine 301 checks if the predicted search query provided by the recommendation engine 302 needs further refining. The decision for further refining of the recommendation may be automatically decided by the intent engine 301 based on a plurality of factors, where the factors comprise, e.g. the number of results that may be returned by the predicted search query, and so on. If further refinement is to be done, the intent engine 301 informs the refinement engine 303.

In another embodiment, the refinement engine 303 checks if the predicted search query provided by the recommendation engine 302 needs further refining. The refinement engine 303, for example, based on the predicted search query from the recommendation engine 302, and/or other information provided by the intent engine 301, prepares a list of questions, which is sent to the user. On receiving a response from the user, the refinement engine 303 further refines the predicted search query and sends the search query to the intent engine 301.

On receiving the refined search query, the system presents the query to the user as a proactive offer. If the user accepts the query, the system runs the searches using a suitable search engine, such as Google, Bing, Yahoo, and so on, although a locally cached profile may also be used instead of, or in addition to, such search engine. In an embodiment, the searches are also run on the website of a company, where the website has a search engine for searches on that website. This search does not necessarily require an algorithm. Rather, embodiments of the invention use a software system that automatically runs the search, e.g. through well known, published APIs of the search engines that are used. The idea here is to do regular search. The results may be displayed in a Web page, an application, a widget, or by any other suitable means, such as on a smartphone display, as shown in FIGS. 1-4. The results may also comprise a section where the best result is highlighted; or the results may be returned to the user in the form of two or more results that are listed in an order that is determined based upon such factors as the relative click through for such results in previous, similar searches. The best result may also be shown to the user in a pop up widget.

The intent engine 301 monitors the response of the user to the search results displayed to the user. For example, the intent engine 301 may track the clicks made by the user, the information viewed by the user, the amount of time the user spends on each piece of information, and so on. The responses of the user are stored in the database 306 and are used to improve searches made by the user and other users in the future.

The intent engine 301 may also request that the user take a survey on the efficacy of the search results. The information provided by the user, if he fills the survey, may be used by the intent engine 301 to improve searches made by the user and other users in the future.

The summarization engine 304 fetches chat, voice transcripts from conversations with the users, and social media/blog/forum transcripts from the knowledge store/repository 305 and text mines this corpus and provides a summary content that is used to build a knowledge repository automatically and at scale. Different algorithms can be used for summarization. The transcripts are filtered using structured attributes, such as highest recommendation score, highest user satisfaction score (CSAT), and highest resolution score for a given issue type. These transcripts are then summarized and stored in the database 306 using Natural Language Processing based summarization techniques.

Figure 6:
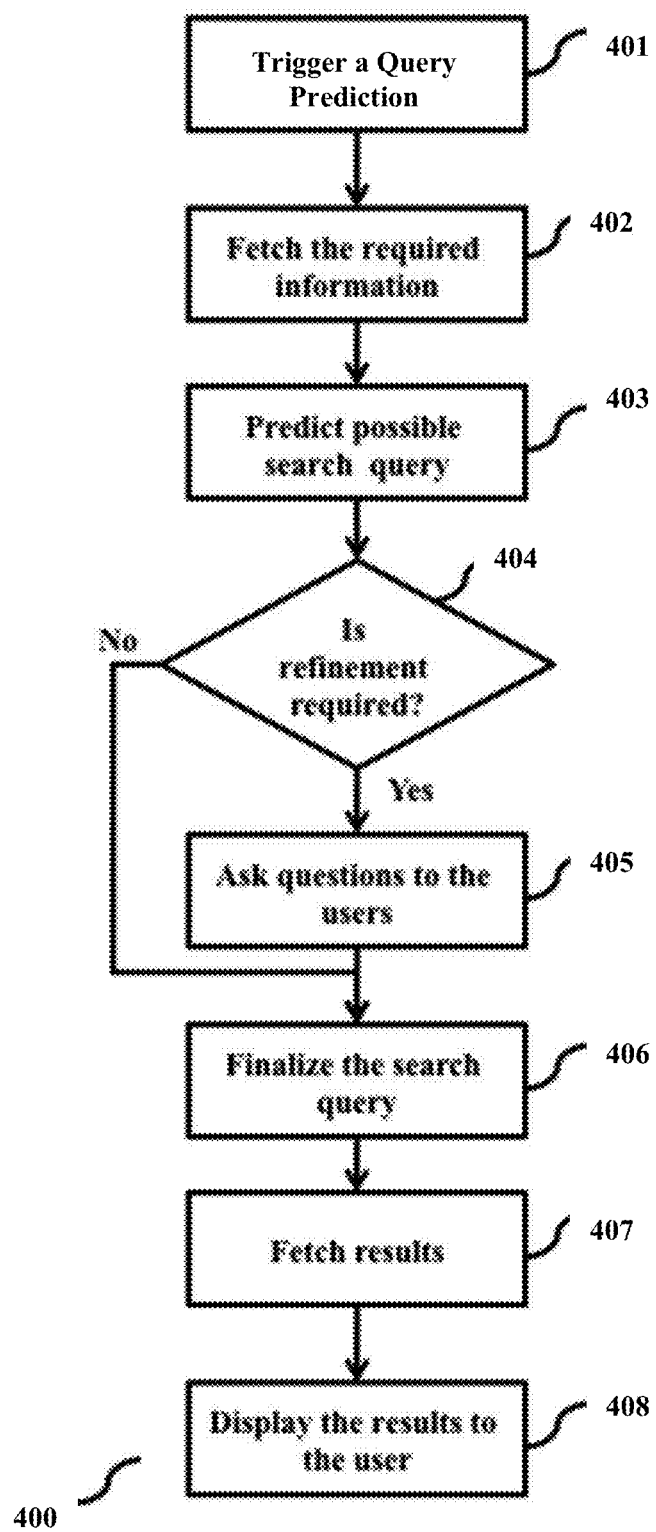
FIG. 6 is a flowchart that depicts a prediction method according to the invention.

FIG. 6 is a flowchart that depicts a prediction method in accordance with an embodiment of the invention in which the system triggers a query prediction (401) based on a user-defined or system-defined event, such as the launch of an application, a comparison of GPS coordinates, the time until the user's next meeting, or the location of the user's next meeting. The intent engine 301 fetches (402) relevant information from the database 306. The information fetched from the database 306 may comprise, for example information that may be resident on a user device, for example the user's contacts, calendar, emails, location, direction of travel, and the like, prior search words and results performed by the user and other users who may be associated with the user; text mined chat transcripts; meta data of the chats; text mined voice transcripts; information present in social networks; data from enterprise pages; any forms filled by the user; and so on.

The intent engine 301 sends the information fetched from the database 306 to the recommendation engine 302, which probabilistically predicts (403) the search query given the above mentioned attributes of the user. The recommendation engine 302 may use one of several algorithms, such as Naïve Bayes, logistic regression, and/or support vector machines (SVM) to predict the probability of a given query being the query of interest for the user.

The recommendation engine 302 sends the predicted search query to the intent engine 301. The predicted search query may be in the form of a key word or key string.

The intent engine 301 also checks (404) if the predicted search query provided by the recommendation engine 302 needs further refining. If further refinement is to be done, the intent engine 301 informs the refinement engine 303 and the refinement engine 303, based on, for example, the predicted search query from the recommendation engine 302 and other information provided by the intent engine 301, and then asks (405) questions of the user. On receiving a response from the user, the refinement engine 303 finalizes (406) the search query and sends the final search query to the intent engine 301.

If refinement is not required, the intent engine 301 finalizes (406) the predicted search query as the search query. The intent engine 301 then presents the search query to the user as a proactive offer. If the user accepts the predicted search query, the system runs the searches using a suitable search engine, such as Google, Bing, Yahoo (407) and displays (408) the results to the user. The results may be displayed in a Web page, an application, a widget, or by any other suitable means.

The various actions in method 400 may be performed in the order presented, in a different order, or simultaneously. Further, in some embodiments, some actions listed in FIG. 8 may be omitted.

Computer Implementation

Figure 7:
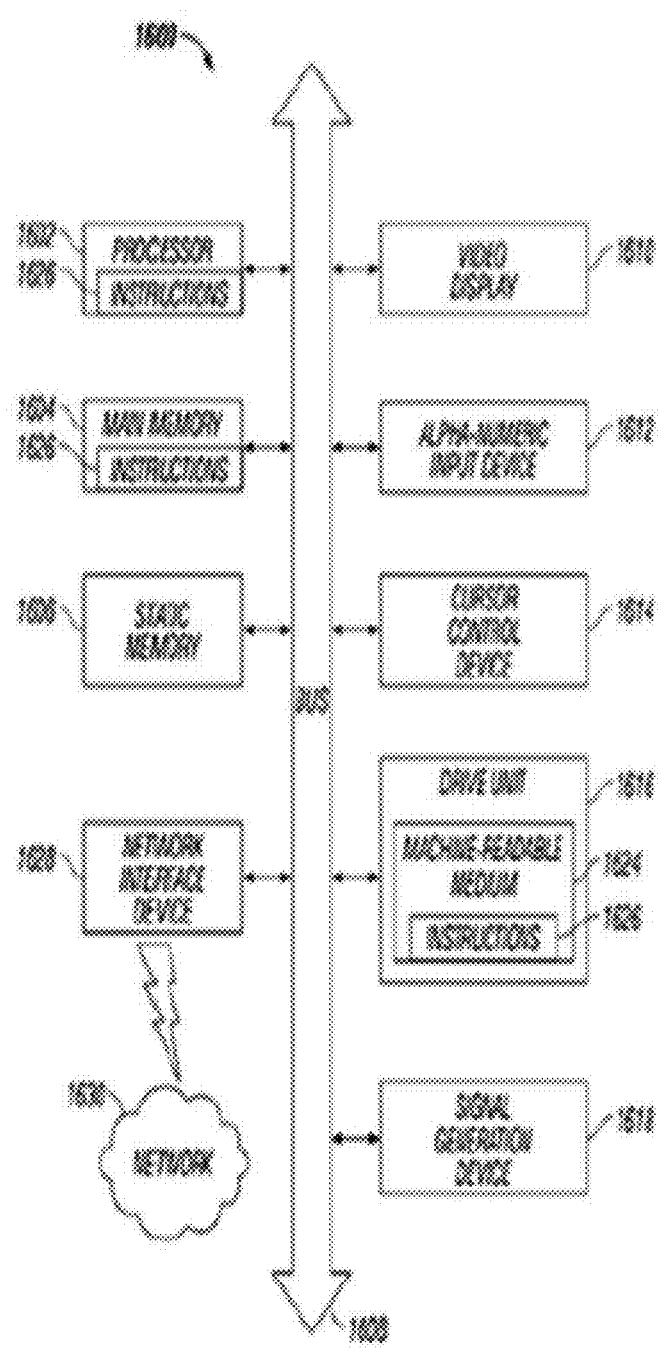
FIG. 7 is a block schematic diagram that depicts a machine in the exemplary form of a computer system within which a set of instructions for causing the machine to perform any of the herein disclosed methodologies may be executed.

FIG. 7 is a block schematic diagram that depicts a machine in the exemplary form of a computer system 1600 within which a set of instructions for causing the machine to perform any of the herein disclosed methodologies may be executed.

In alternative embodiments, the machine may comprise or include a network router, a network switch, a network bridge, personal digital assistant (PDA), a cellular telephone, a Web appliance or any machine capable of executing or transmitting a sequence of instructions that specify actions to be taken.

The computer system 1600 includes a processor 1602, a main memory 1604 and a static memory 1606, which communicate with each other via a bus 1608. The computer system 1600 may further include a display unit 1610, for example, a liquid crystal display (LCD) or a cathode ray tube (CRT). The computer system 1600 also includes an alphanumeric input device 1612, for example, a keyboard; a cursor control device 1614, for example, a mouse; a disk drive unit 1616, a signal generation device 1618, for example, a speaker, and a network interface device 1628.

The disk drive unit 1616 includes a machine-readable medium 1624 on which is stored a set of executable instructions, i.e., software, 1626 embodying any one, or all, of the methodologies described herein below. The software 1626 is also shown to reside, completely or at least partially, within the main memory 1604 and/or within the processor 1602. The software 1626 may further be transmitted or received over a network 1630 by means of a network interface device 1628.

In contrast to the system 1600 discussed above, a different embodiment uses logic circuitry instead of computer-executed instructions to implement processing entities. Depending upon the particular requirements of the application in the areas of speed, expense, tooling costs, and the like, this logic may be implemented by constructing an application-specific integrated circuit (ASIC) having thousands of tiny integrated transistors. Such an ASIC may be implemented with CMOS (complementary metal oxide semiconductor), TTL (transistor-transistor logic), VLSI (very large systems integration), or another suitable construction. Other alternatives include a digital signal processing chip (DSP), discrete circuitry (such as resistors, capacitors, diodes, inductors, and transistors), field programmable gate array (FPGA), programmable logic array (PLA), programmable logic device (PLD), and the like.

It is to be understood that embodiments may be used as or to support software programs or software modules executed upon some form of processing core (such as the CPU of a computer) or otherwise implemented or realized upon or within a machine or computer readable medium. A machine-readable medium includes any mechanism for storing or transmitting information in a form readable by a machine, e.g. a computer. For example, a machine readable medium includes read-only memory (ROM); random access memory (RAM); magnetic disk storage media; optical storage media; flash memory devices; electrical, optical, acoustical or other form of propagated signals, for example, carrier waves, infrared signals, digital signals, etc.; or any other type of media suitable for storing or transmitting information.

Although the invention is described herein with reference to the preferred embodiment, one skilled in the art will readily appreciate that other applications may be substituted for those set forth herein without departing from the spirit and scope of the present invention. Accordingly, the invention should only be limited by the Claims included below.

The invention claimed is:

1. A computer-implemented predictive information method comprising:
   detecting, by an application executed by a processor of a mobile computing device associated with a user, a user action performed on the mobile computing device within said user's possession;
   predicting, by said application, that said user action, either explicitly or implicitly, comprises a query from said user by examining said user's calendar and at least one of user information stored on the mobile computing device, current time, search terms previously typed or spoken by said user and any other historical attributes of said user, user movement, historical or current journey attributes of said user, user profile, and user location;
   based upon said predicting,
      determining, by said application, any of said user's intent, query category, and issue category; and
   based upon said determining,
      formulating, by said application, a proactive offer to perform an action on behalf of said user that is related to said user's intent; and
      delivering, by said application, the proactive offer to said user via an alert initiated by the application.

2. The method of claim 1, said user action comprising a user response to the proactive offer presented to said user by said application.

3. The method of claim 1, further comprising:
   presenting, by said application, the proactive offer through any of the following: displayed text, displayed graphics, video, and an audio prompt.

4. The method of claim 1, further comprising:
   processing, by said application, a user response to the proactive offer with a speech recognition grammar.

5. The method of claim 1, wherein performing the action further comprises:

running, by said application, a query contained in the proactive offer upon acceptance by said user; and
presenting, by said application, query results to said user.

6. The method of claim 5, further comprising:
personalizing, by said application, the query results returned to said user based on a user preference.

7. The method of claim 1, further comprising:
running, by said application, a query contained in the proactive offer; and
predicting, by said application, a preferred sort order for presenting query results to said user.

8. The method of claim 1, further comprising:
determining, by said application, whether said user has provided a user response;
in response to determining the user response was provided,
analyzing, by said application, said user response; and
initiating, by said application, the action based on said analyzing.

9. The method of claim 8, said action comprising any of:
dialing a telephone number;
sending a text message;
sending an email;
navigating to a Web page;
posting content to a social media site;
opening an application;
scheduling an appointment and/or meeting;
proposing an alternate meeting location; and
performing text to speech conversion of a query result.

10. The method of claim 5, further comprising:
providing an interactive feature set that allows said user to manipulate said query results.

11. The method of claim 5, further comprising:
providing, by said application, a dialog with which said user can integrate said query results with a contacts application.

12. The method of claim 1, further comprising:
performing, by said application, said action by running a query; and
returning, by said application, query results to said user based on said user's calendar appointments,
wherein running said query requires the application be allowed to access said user's calendar, including scheduled meetings, meeting invitees, and meeting location; said user's contacts; said user's emails; said user's location, including any of said user's current location and directional movement; and current time.

13. The method of claim 12, further comprising:
performing, by said application, any of searching for and providing to said user directions; posting content to a social media site; and sending an address for an appointment to one or more attendees.

14. The method of claim 1, further comprising:
performing, by said application, said action and returning results to said user based on integration to one or more reservation systems;
predicting, by said application, said user's time of arrival at a destination based on said user's current location and a destination address;
when said user's time of arrival is predicted to be after a scheduled appointment at said destination,
proactively contacting, by said application, a reservation system associated with said destination and identifying an available appointment at said destination that is consistent with said user's calendar; and
updating, by said application, both said reservation system and said user's calendar accordingly.

15. The method of claim 14, wherein performing said action requires the application be allowed to access said user's calendar, including scheduled meetings, meeting invitees, and meeting location; said user's contacts; said user's emails; said user's location, including any of said user's current location and directional movement; current time; and one or more reservation systems.

16. The method of claim 1, further comprising:
performing, by said application, said action and returning results to said user based on usage history of the application, said usage history comprising a search by said user;
tracking, by said application, said user's location over time and determining that said user has not visited a business location associated with said search since the search was performed;
in response to determining that said user's current location is proximate to the business location associated with said search,
evaluating, by said application, a plurality of user-related factors that include any of time-of-day, day-of-week, and said user's previous behavior;
determining, by said application, whether said user should be notified of said user's proximity to said business location; and
when said application determines that said user should be notified, sending, by said application, an alert to said user with an address of, and hours of operation at, said business location.

17. The method of claim 16, wherein performing said action requires the application be allowed to access said user's current location, directional movement, and location history; said user's historical search and purchase behavior; one or more business locations; and current time.

18. The method of claim 1, further comprising:
performing, by said application, said action and returning results to said user based on data sharing for expedited service;
allowing said user to search for a business;
when said user connects telephonically to said business, providing, by said application, said user with a current hold and/or wait time until an agent is available to answer said user's call; and
proactively offering, by said application, to expedite said user's call in exchange for said user sharing certain information with said business.

19. The method of claim 18, wherein performing said action requires the application be allowed to access said user's personal information, including any of said user's name, address, phone number, and photo; and said user's current location and directional movement.

20. An apparatus for providing predictive information, the apparatus comprising:
a processor that executes an application that is configured for detecting a user action performed on a mobile computing device within said user's possession;
said application configured for predicting that said user action, either explicitly or implicitly, comprises a query from said user by examining said user's calendar and at least one of user information stored on, or associated with, the mobile computing device, current time, search terms previously typed or spoken by said user and any other historical attributes of said user, user movement, historical or current journey attributes of said user, user profile, and user location;
based upon said predicting, said application configured for determining any of said user's intent, query category, and issue category; and
based upon said determining,
said application configured for formulating a proactive offer to perform an action on behalf of said user that is related to said user's intent; and
said application configured for delivering the proactive offer to said user via an alert initiated by the application.

* * * * *